Feb. 24, 1942.   W. V. COATE   2,273,937
TRACTION LUG
Filed April 24, 1940
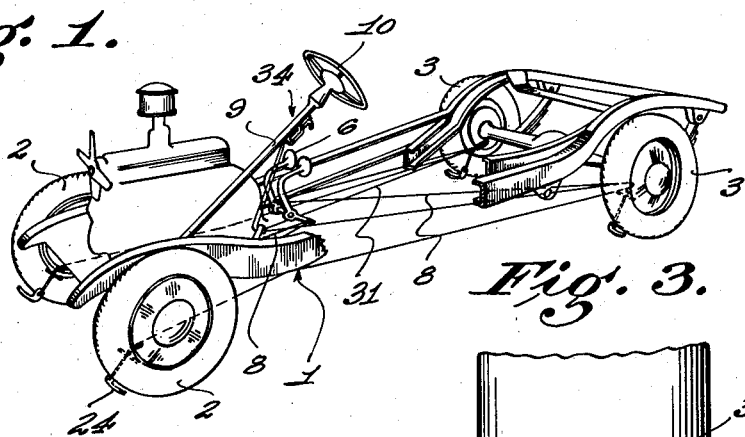
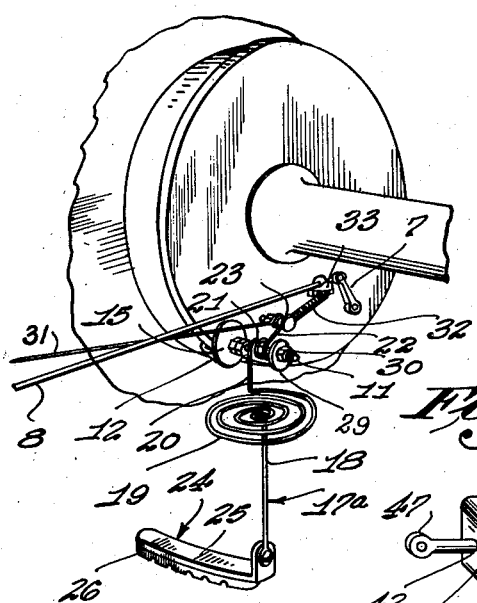
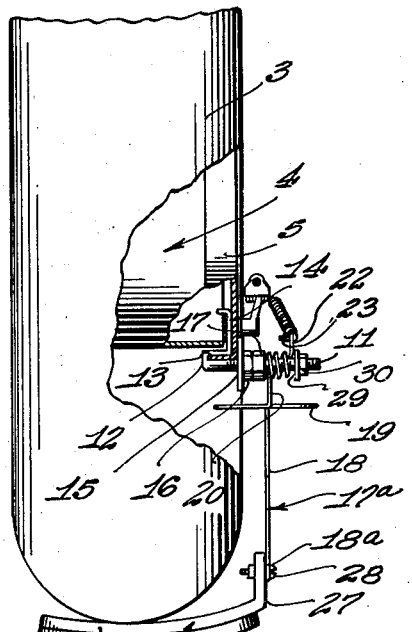
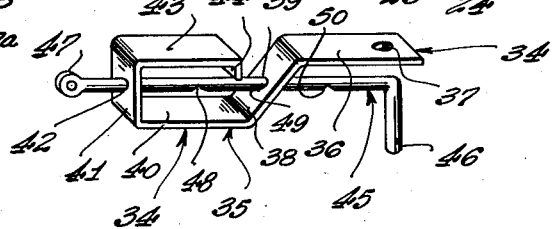
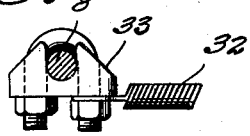
Inventor
William V. Coate
By Lacey & Lacey, Attorneys Patented Feb. 24, 1942

2,273,937

UNITED STATES PATENT OFFICE 2,273,937

TRACTION LUG

William Vernal Coate, Greenville, Ohio

Application April 24, 1940, Serial No. 331,457

14 Claims. (Cl. 188—4)

This invention relates to an improved traction lug, and has for one of its objects to provide a device of this character which may be readily attached to a vehicle and which may be easily brought into operation for preventing skidding of said vehicle on slippery surfaces.

Another object of the invention is to provide a traction lug which may be operated simultaneously with operation of the foot brake of the vehicle or which may be operated independently of the brake of said vehicle.

A further object of the invention is to provide a traction lug which will, when in operative position, be disposed adjacent a wheel to be run over by said wheel for providing additional traction for the wheel, means being provided for returning the surface-engaging element to operative position in front of the wheel immediately after said element has been run over.

A further object of the invention is to provide a traction lug having controlling means which is adjustable for moving the surface-engaging element into inoperative position, into position for simultaneous operation with the foot brakes of the vehicle, or into position for operation independently of said foot brakes.

A further object of the invention is to provide a device of this character which will be of durable construction so that it will be capable of use over long periods of time without replacement.

Other objects of the invention, not mentioned hereinbefore, will become apparent during the course of the following description.

In the drawing:

Figure 1 is a perspective view showing a set of traction lugs, made according to my invention, installed on the chassis of a motor vehicle, Figure 2 is an enlarged detail perspective view showing one of the traction lugs as it would appear installed and moved to operative position, Figure 3 is a front elevation, partly broken away and shown in section, showing the manner of mounting the traction lug on a vehicle brake drum, Figure 4 is an enlarged perspective view of the control unit employed, and Figure 5 is a sectional view showing the clamp used for operatively connecting one of the traction lugs with a brake rod.

Referring now to the drawing wherein similar reference numerals are used to designate similar parts, the numeral 1 indicates in general the chassis of a motor vehicle. It should be understood that my improved traction lug may be installed on a road vehicle of any type, and that the use of a motor vehicle is only by way of example. The chassis 1 is provided with front and rear wheels 2 and 3. The wheels are each provided with brake drums 4 having stationary rear walls 5. A brake pedal is shown at 6, and said brake pedal is operatively connected with a brake operating crank 7 by means of brake rods 8, one of said rods extending to engage the brake operating crank 7 on the rear wall 5 of each brake. The vehicle chassis 1 is provided with a steering column 9 having a steering wheel 10 thereon.

One of my improved traction lugs is mounted to cooperate with each wheel of the vehicle. The traction lugs are identical in construction so that it is believed that a description of one will suffice for all. A typical traction lug includes a mounting bolt 11 which is threaded throughout the major portion of its length. The mounting bolt 11 includes, at its inner end, a clamp 12 which is shaped to fit about the outwardly directed flange 13 of the rear wall 5 of the drum 4. As will be seen by referring to Figure 3, the clamp 12 includes an extended portion 14 which is adapted to bear against the inner surface of the wall 5. A washer 15 is carried on the bolt 11 and is held in engagement with the inner face of the wall 5 by means of a nut 16. A lock nut 17 is screwed against the nut 16 for effectively locking it in place. It will now be understood that the mounting bolt 11 will be firmly clamped to the rear wall 5 of the drum 4, with the threaded portion of said bolt extending inwardly.

Associated with the mounting bolt 11 is a connecting member 17a which is formed from a single length of heavy spring wire. The connecting member 17a includes a shank 18 having an eye 18a at its lower end. At its upper end, the shank is extended and coiled to define a helical spring 19 and extended to define a connecting shank 20, and said connecting shank has its upper end connected with a coiled bearing portion 21. The end of the coiled bearing portion is extended to define an operating lever 22 which is formed with an eye 23 at its upper end.

The numeral 24 indicates a surface engaging element which is substantially reversed L-shape in configuration. The surface-engaging element 24 is formed with a relatively long arm 25 on the under surface of which is mounted a tread 26 which is formed of rubber or other suitable material. The tread 26 is formed with an irregular lower surface so as to improve its traction qualities. The surface-engaging element also includes a relatively short arm 27 which is operatively connected with the eye 18a of the shank 18 by means of a bolt 28. As will be seen in Figures 1 and 3 of the drawings, the surface-engaging element is, when in operative position, disposed with the relatively long arm in confronting relation to the tread of the tire of the wheel with which it is associated so that said wheel will be enabled to engage the element and roll over it.

The coiled bearing portion 21 is held in place on the threaded portion of the bolt 11 by means of a washer 29 and a nut 30. The eye 23 of the operating lever 22 is connected with the free end of an operating wire 31, the opposite end of said wire being connected with the control unit to be described presently. The operating lever 22 is resiliently connected to the free end of the brake rod 8 by means of a coil spring 32 and a clamp 33. The clamp 33 is shown in detail in Figure 5 of the drawing and is effectively secured to the end portion of the brake rod in such a manner that, when said brake rod is moved to a position to set the brakes, the lever 22 will be shifted for positioning the surface-engaging element in front of the wheel.

The control unit for shifting the operating wires 31 is shown in enlarged perspective in Figure 4 of the drawing. The control unit is designated generally by the numeral 34 and includes a body 35 which is formed from a single length of strap metal. The body 35 is formed with a straight attaching portion 36 which is apertured at 37. The inner end of the attaching portion 36 is projected obliquely downwardly to define a central portion 38 which is formed with an opening 39. The central portion 38 is bent laterally, parallel with the attaching portion, to define a lower portion 40, and said lower portion is projected at right angles at its inner end to define an end wall 41. The end wall is provided with an opening 42 which is disposed in longitudinal alinement with the opening 39. The end wall has its upper end projected rearwardly and in parallel relation to the lower portion thereabove to define a spring top wall 43 which terminates in a retarding tongue 44.

Shiftably mounted on the body 35, and extending through the openings 39 and 42, is a control lever 45. The control lever is formed at its upper end with a manually engageable portion 46 and at its lower end with an eye 47. Spaced along the length of the control lever are notches 48, 49 and 50. The retarding tongue 44 is positioned to bear against the control lever and urge said control lever downwardly so that, when any one of the notches is moved to confront the opening 39, the margin of said opening will cooperate with said notch to define a detent for retaining the lever in a set position with the walls of the notch in the opening 39. The eye 47 has connected therewith the inner ends of the operating wires 31. As seen in Figure 1, the control unit may be conveniently mounted on the steering column 9 beneath the steering wheel 8. It should be understood, however, that the control unit may be mounted in any desired position. The operation of my improved traction lug will now be described:

The surface-engaging element 24 is moved into and out of operative positions by means of the control lever 45 of the control unit 34. More specifically, when the control lever 45 of the control unit is moved to intermediate position, as shown in Figure 4 of the drawing, the operating wires 31 will shift the surface-engaging elements to inoperative position with respect to the wheels 2 and 3. The levers 22 will be positioned, by said wires 31, substantially parallel with respect to the brake rods 8 so that, when said brake rods are moved for setting the brakes, movement of said brake rods will transmit movement through the springs 32 to the levers 22 for bringing the surface-engaging elements into operative positions before the wheels 2 and 3. When the control lever is pulled upwardly for engaging the notch 48 with the margin of the opening 39, the operating wires 31 will shift the surface-engaging elements to operative position, irrespective of the position of the brake rods. When the lever 45 is shifted for engaging the notch 50 in the margin of the opening 39, the wires 31 will be shifted for moving and retaining the surface-engaging elements in raised, inoperative position. It will now be understood that the surface-engaging elements of my improved traction lug may be moved into and out of operative position either by operation of the foot brakes or by manual engagement with the control unit. The operating wires 31 are arranged so that the surface-engaging elements will work simultaneously and with the utmost ease.

When the surface-engaging elements of my improved traction lug are in operative position, one of said lugs being positioned in front of each wheel at a point near the surface over which the wheel is traveling, said wheels will roll over the surface-engaging elements. The result will be that said surface-engaging elements will provide additional traction for the wheel at the surface over which it is rolling. After the wheels have rolled over the surface-engaging elements, their respective springs 19 will return the elements along the inner surfaces of the wall of the tires of said wheels and will position said elements for another engagement by the wheels. It will now be seen that said surface-engaging elements will, when in operative position, provide added traction for said wheels.

Having thus described the invention, what is claimed as new is:

1. In a traction lug, in combination with a vehicle having a wheel, a brake having a brake drum having a rear wall, and means for operating the brake, a surface-engaging element, means operatively connecting the surface-engaging element with the rear wall, means connecting the brake operating means with the last mentioned means, and means connected with said last-mentioned means and being operable for shifting the surface-engaging element from an inoperative position above a surface to an operative position in front of a wheel to be run over by said wheel, said second mentioned means automatically returning the surface engaging element to operative position after said surface engaging element has been run over by the wheel.

2. In a traction lug, a surface-engaging element, a mounting bolt, a connecting member operatively connecting the surface-engaging element with the mounting bolt, means on the mounting bolt for securing the device to a brake drum rear wall with the surface-engaging element disposed to confront a wheel, and means connected with said last-mentioned means and being shiftable for positioning the surface-engaging element to engage a surface to be run over by the wheel whereby additional traction will be provided for said wheel.

3. In a traction lug, a surface-engaging element having a curved tread, a mounting bolt, means operatively connecting the mounting bolt to a brake drum rear wall, a connecting member swingingly connecting the surface-engaging element with the mounting bolt, said connecting member having a helical spring and a coiled bearing portion, said coiled bearing portion being extended to define an operating lever, and means connected with the operating lever and being shiftable for moving the surface-engaging element to engage a surface and a wheel above the surface for providing additional traction for said wheel, said helical spring returning the surface-engaging element to operative position after passing beneath the wheel.

4. In a traction lug, a reversed L-shaped surface-engaging element, a tread on the surface-engaging element and having an irregular gripping surface, and means for operatively connecting the surface-engaging element with a vehicle brake drum rear wall, said means being shiftable for positioning the surface-engaging element adjacent a surface and a wheel to be run over by said wheel for providing additional traction for the wheel.

5. In a traction lug, a surface-engaging element of substantially reversed L shape, said element having a curved arm, a surface-engaging tread on the arm, means operatively connecting the surface-engaging element with a brake drum rear wall, means for swinging the surface-engaging element to a position to be run over by a vehicle wheel, and means on said first-mentioned means for returning the surface-engaging element to a position to be run over again after said element has been run over.

6. In a traction lug, a mounting bolt, a clamp on the mounting bolt, means engageable with the clamp for securing the mounting bolt on a brake drum rear wall, the surface-engaging element having a surface gripping tread, a connecting member swingingly connecting the surface-engaging element with the mounting bolt, said connecting member having a coiled bearing portion surrounding the mounting bolt, said coiled bearing portion being extended to define a lever, and an operating wire connected with the lever and being shiftable for moving the surface-engaging element out of a position above a surface to an operative position to be run over by a wheel whereby additional traction will be provided for said wheel.

7. In a traction lug, a surface-engaging element, means operatively connecting the surface-engaging element with a brake drum rear wall, an operating wire connected with said means, a control unit connected with the operating wire and having a control lever shiftable for shifting the operating wire, and means shiftable by the wire whereby the surface-engaging element will be positioned to be run over by a vehicle wheel for providing additional traction for said wheel.

8. In a traction lug, a control unit including a body having an attaching portion, an obliquely disposed central portion, a lower portion having an end wall, and a control lever extending through the central portion and end wall and being provided with notches selectively engageable with a portion of the central portion for retaining the control lever in a set position.

9. In a traction lug, in combination with a vehicle having a wheel provided with a brake having a drum, said drum having a rear wall, a surface-engaging element, a mounting bolt on the rear wall, a connecting member swingingly connecting the surface-engaging element with the mounting bolt, said connecting member being formed from a single length of wire and including a helical spring and a coiled bearing portion, said coiled bearing portion surrounding the mounting bolt and being projected to define a lever, an operating wire having one end connected with the lever, a spring having one end connected with the lever, a clamp connecting the other end of the spring with a brake rod, and a control unit, said control unit having a control lever connected with the operating wire, said control lever being movable to one position for disposing the surface-engaging element in inoperative position above a surface, to another position for causing said surface-engaging element to be swung to operative position upon movement of the brake rod and to still another position for causing the surface-engaging element to be moved to operative position irrespective of movement of the brake rod, said surface-engaging element being located, in operative position, to be run over by the wheel for providing additional traction for said wheel.

10. In a device of the class described, the combination with a vehicle having wheels provided with brakes, said brakes having drums and said drums having rear walls with operating levers thereon, and brake rods operatively connected with the levers, surface-engaging elements, a mounting bolt on each of the rear walls of the drums, a connecting member swingingly connecting one of the surface-engaging elements with each of the mounting bolts, an operating wire connected with each of the connecting members and being shiftable for moving the connecting members and surface-engaging elements to a position to be run over by the wheels for providing additional traction for the wheels, and means resiliently connecting the connecting members with the brake rods and being operable by movement of the brake rods for shifting the surface-engaging elements to operative position.

11. In a device of the class described, a surface-engaging element, a bolt to be mounted on the rear wall of a brake drum, and a connecting member swingingly connecting the surface-engaging element with the bolt, said connecting member consisting of a single strand of resilient wire.

12. In a device of the class described, a surface engaging element, a bolt to be mounted on a vehicle and a connecting member swingingly connecting the surface engaging element with the bolt, said connecting member including a shank, a lever, a coiled bearing portion, and a helical spring.

13. In a device of the class described as recited in claim 12, wherein the connecting member is formed from a single strand of resilient wire.

14. In a traction lug as recited in claim 8 wherein the lower portion includes a retarding tongue, said retarding tongue being engageable with a portion of the control lever for preventing accidental shifting movement thereof.

WILLIAM VERNAL COATE.